(12) United States Patent
Sith et al.

(10) Patent No.: US 10,605,394 B2
(45) Date of Patent: Mar. 31, 2020

(54) FITTING HAVING TABBED RETAINER AND OBSERVATION APERTURES

(71) Applicant: Victaulic Company, Easton, PA (US)

(72) Inventors: Ahmad Sith, Bethleham, PA (US); Matthew A. Bowman, Palmer, PA (US); Scott D. Madara, Nazareth, PA (US); Jeffrey Lance Sterner, Hamburg, PA (US)

(73) Assignee: Victaulic Company, Easton, PA (US)

( * ) Notice: Subject to any disclaimer, the term of this patent is extended or adjusted under 35 U.S.C. 154(b) by 69 days.

(21) Appl. No.: 15/593,681

(22) Filed: May 12, 2017

(65) Prior Publication Data

US 2017/0328507 A1 Nov. 16, 2017

Related U.S. Application Data

(60) Provisional application No. 62/336,893, filed on May 16, 2016.

(51) Int. Cl.
*F16L 37/091* (2006.01)
*F16L 17/04* (2006.01)
(Continued)

(52) U.S. Cl.
CPC .............. *F16L 43/00* (2013.01); *F16L 17/04* (2013.01); *F16L 21/08* (2013.01);
(Continued)

(58) Field of Classification Search
CPC ..... F16L 43/00; F16L 37/0915; F16L 37/091; F16L 17/04; F16L 17/06; F16L 23/18; F16L 21/16; F16L 21/08
(Continued)

(56) References Cited

U.S. PATENT DOCUMENTS

| 285,179 A | 9/1883 | Tibbals |
| 1,020,123 A | 3/1912 | Brampton et al. |

(Continued)

FOREIGN PATENT DOCUMENTS

| CN | 102345774 | 2/2012 |
| CN | 102933886 | 2/2013 |

(Continued)

OTHER PUBLICATIONS

Copenheaver, Blane R.; International Search Report from counterpart International Patent Application No. PCT/US2017/032580, dated Jul. 20, 2017, pp. 1-2, United States Patent and Trademark Office as Searching Authority, Alexandria, Virginia USA.

(Continued)

*Primary Examiner* — Anna M Momper
*Assistant Examiner* — Fannie C Kee
(74) *Attorney, Agent, or Firm* — Ballard Spahr LLP

(57) ABSTRACT

A pipe fitting for plain end pipe is formed of housing portions defining receptacles for receiving pipe elements. The receptacles are coaxial with respective axes oriented angularly with respect to each other. Each receptacle has a channel that faces a respective axis with floors at different radii of curvature. Retainers are received within the channels. The retainers have teeth and one or more offset tabs that cooperate with the channels to prevent improper assembly of the fitting. Ring seals are received within channels positioned adjacent to the receptacles. The ring seals cooperate with the retainers to hold the segments in spaced relation sufficient to insert pipe elements into the receptacles when the fitting is pre-assembled. Apertures are provided in the receptacles to permit visual determination of the presence of the retainers post assembly.

45 Claims, 6 Drawing Sheets

(51) Int. Cl.
*F16L 21/08* (2006.01)
*F16L 43/00* (2006.01)

(52) U.S. Cl.
CPC ......... *F16L 37/0915* (2016.05); *F16L 37/091* (2013.01); *F16L 2201/10* (2013.01)

(58) Field of Classification Search
USPC ................... 285/179, 373, 93, 340, 419–420
See application file for complete search history.

(56) References Cited

U.S. PATENT DOCUMENTS

| | | | |
|---|---|---|---|
| 1,074,395 A | 9/1913 | Welch |
| 1,203,989 A | 11/1916 | Dehn |
| 1,287,108 A | 12/1918 | Robinson et al. |
| 1,379,811 A | 5/1921 | Fyffe |
| 1,497,549 A | 6/1924 | Conradi |
| 1,649,594 A | 11/1927 | Johnson |
| 1,770,271 A | 7/1930 | Hoppes |
| 1,831,641 A | 11/1931 | Skinner |
| 1,969,043 A | 8/1934 | Sham |
| 1,999,045 A | 4/1935 | Goetz |
| 2,021,081 A | 11/1935 | Nagao |
| 2,021,082 A | 11/1935 | North |
| 2,094,258 A | 9/1937 | Thompson |
| 2,128,720 A | 8/1938 | Tweedale |
| 2,225,208 A | 12/1940 | Crickmer |
| 2,412,394 A | 12/1946 | Giles |
| 2,426,423 A | 8/1947 | Woolsey |
| 2,459,251 A | 1/1949 | Stillwagon |
| 2,463,235 A | 3/1949 | Andrews |
| 2,491,004 A | 12/1949 | Graham |
| 2,635,901 A | 4/1953 | Osborn |
| 2,775,806 A | 1/1957 | Love |
| 2,926,028 A | 2/1960 | Hookings et al. |
| 2,958,546 A | 11/1960 | Lee |
| 3,014,259 A | 12/1961 | Joseph |
| 3,116,078 A | 12/1963 | Scherer |
| 3,148,896 A | 9/1964 | Chu |
| 3,153,550 A | 10/1964 | Hollett |
| 3,235,293 A | 2/1966 | Condon |
| 3,362,730 A | 1/1968 | Clair et al. |
| 3,466,069 A | 9/1969 | Hoke et al. |
| 3,517,701 A | 6/1970 | Smith |
| 3,596,935 A | 8/1971 | McGeoch, Sr. |
| 3,633,943 A | 1/1972 | Ramm et al. |
| 3,680,894 A | 8/1972 | Young |
| 3,788,677 A | 1/1974 | Stade et al. |
| 3,794,360 A | 2/1974 | Bachle et al. |
| 3,825,286 A | 7/1974 | Henry, III |
| 3,861,723 A | 1/1975 | Kunz et al. |
| 3,920,270 A | 11/1975 | Babb, Jr. |
| 3,944,260 A | 3/1976 | Petroczky |
| 4,018,979 A | 4/1977 | Young |
| 4,073,514 A | 2/1978 | Pate |
| 4,119,333 A | 10/1978 | Straub |
| 4,123,090 A | 10/1978 | Kotsakis et al. |
| 4,181,329 A | 1/1980 | Helm |
| 4,225,160 A | 9/1980 | Ortloff |
| 4,273,367 A | 6/1981 | Keeney et al. |
| 4,284,298 A | 8/1981 | Kaufmann, Jr. |
| 4,443,029 A | 4/1984 | Laxo |
| 4,461,498 A | 7/1984 | Kunsman |
| 4,471,979 A | 9/1984 | Gibb et al. |
| 4,611,839 A | 9/1986 | Rung et al. |
| 4,629,217 A | 12/1986 | Straub |
| 4,633,913 A | 1/1987 | Carty et al. |
| 4,639,020 A | 1/1987 | Rung et al. |
| 4,652,023 A | 3/1987 | Timmons |
| 4,664,422 A | 5/1987 | Straub |
| 4,678,208 A | 7/1987 | De Raymond |
| 4,792,160 A | 12/1988 | Hwang |
| 4,819,974 A | 4/1989 | Zeidler |
| 4,838,584 A | 6/1989 | Dierksmeier |
| 4,842,306 A | 6/1989 | Zeidler et al. |
| 4,861,075 A | 8/1989 | Pepi et al. |
| 4,893,843 A | 1/1990 | DeRaymond |
| 4,896,902 A | 1/1990 | Weston |
| 4,898,407 A | 2/1990 | Zeidler |
| 5,018,768 A | 5/1991 | Palatchy |
| 5,022,685 A | 6/1991 | Stiskin et al. |
| 5,121,946 A | 6/1992 | Jardine |
| 5,137,305 A | 8/1992 | Straub |
| 5,161,836 A | 11/1992 | McKinnon |
| 5,203,594 A | 4/1993 | Straub |
| 5,230,537 A | 7/1993 | Newman |
| 5,273,322 A | 12/1993 | Straub |
| 5,280,970 A | 1/1994 | Straub |
| 5,452,922 A | 9/1995 | Ziu |
| 5,603,350 A | 2/1997 | Stoll et al. |
| 5,605,865 A | 2/1997 | Maniar et al. |
| 5,675,873 A | 10/1997 | Groess |
| 5,681,062 A | 10/1997 | Fukao et al. |
| 5,722,702 A | 3/1998 | Washburn |
| 5,758,907 A | 6/1998 | Dole et al. |
| 5,769,467 A | 6/1998 | Bridges |
| 5,772,257 A | 6/1998 | Webb et al. |
| 5,782,499 A | 7/1998 | Gfrer et al. |
| 5,786,054 A | 7/1998 | Platusich et al. |
| 5,813,437 A | 9/1998 | Esser |
| 5,911,446 A | 6/1999 | McLennan et al. |
| 5,961,154 A | 10/1999 | Williams et al. |
| 6,030,006 A | 2/2000 | Lin |
| 6,056,332 A | 5/2000 | Foster |
| 6,276,726 B1 | 8/2001 | Daspit |
| 6,276,729 B1 | 8/2001 | Sanwald et al. |
| 6,305,719 B1 | 10/2001 | Smith, Jr. et al. |
| 6,328,352 B1 | 12/2001 | Geppert et al. |
| 6,367,849 B1 | 4/2002 | Tatsuta et al. |
| 6,450,551 B1 | 9/2002 | Lee |
| 6,499,771 B1 | 12/2002 | Snyder, Sr. et al. |
| 6,505,865 B2 | 1/2003 | Minemyer |
| 6,626,456 B2 | 9/2003 | Terbu et al. |
| 6,672,631 B1 | 1/2004 | Weinhyold |
| 6,749,232 B2 | 6/2004 | Wachter et al. |
| 7,070,209 B2 | 7/2006 | Collins |
| 7,086,131 B2 | 8/2006 | Gibb et al. |
| 7,341,287 B2 | 3/2008 | Gibb et al. |
| 7,434,846 B2 | 10/2008 | Baumgartner |
| 7,490,866 B2 | 2/2009 | Webb et al. |
| 7,500,699 B2 | 3/2009 | Snyder, Sr. et al. |
| 7,523,963 B2 | 4/2009 | Draper et al. |
| 7,644,960 B2 | 1/2010 | Casey, Sr. et al. |
| 7,654,587 B2 | 2/2010 | Gibb et al. |
| 7,712,796 B2 | 5/2010 | Gibb et al. |
| 7,726,703 B2 | 6/2010 | Porter et al. |
| 7,748,753 B2 | 7/2010 | Krausz et al. |
| 7,789,434 B2 | 9/2010 | Nagle et al. |
| 7,798,535 B2 | 9/2010 | Calhoun |
| 7,841,630 B1 | 11/2010 | Auray et al. |
| 7,861,982 B1 | 1/2011 | McClure |
| 7,866,707 B2 | 1/2011 | Sudar |
| 8,424,179 B2 | 4/2013 | Webb et al. |
| 8,820,795 B2 * | 9/2014 | Dole ..................... F16L 17/04 285/179 |
| 8,827,214 B2 | 9/2014 | Ogawa |
| 9,182,058 B2 | 11/2015 | Cygler, III et al. |
| 9,791,083 B2 | 10/2017 | Gibb |
| 9,890,884 B1 | 2/2018 | Chiproot |
| 9,976,677 B2 | 5/2018 | Lurk |
| 2002/0135184 A1 | 9/2002 | Snyder, Sr. et al. |
| 2002/0185868 A1 | 12/2002 | Snyder, Sr. et al. |
| 2003/0020276 A1 | 1/2003 | Steele |
| 2004/0237632 A1 | 12/2004 | Van Keeken |
| 2005/0001428 A1 | 1/2005 | Scherrer |
| 2005/0028366 A1 | 2/2005 | Bien et al. |
| 2005/0067538 A1 | 3/2005 | Stigler |
| 2005/0082831 A1 | 4/2005 | Borland |
| 2005/0253380 A1 | 11/2005 | Gibb et al. |
| 2006/0125236 A1 | 6/2006 | Cuvo et al. |
| 2006/0138776 A1 | 6/2006 | Amedure et al. |
| 2006/0214422 A1 | 9/2006 | Cuvo et al. |
| 2007/0024056 A1 | 2/2007 | Borland |
| 2008/0265568 A1 | 10/2008 | Bekkevold |

(56) References Cited

U.S. PATENT DOCUMENTS

| | | |
|---|---|---|
| 2008/0272595 A1 | 11/2008 | Gibb et al. |
| 2009/0127846 A1 | 5/2009 | Dole et al. |
| 2009/0160183 A1 | 6/2009 | Felber |
| 2009/0172939 A1 | 7/2009 | Dole |
| 2009/0206598 A1 | 8/2009 | Gibb et al. |
| 2010/0115733 A1 | 5/2010 | Bouchiat et al. |
| 2010/0320756 A1 | 12/2010 | Gibb et al. |
| 2010/0320758 A1 | 12/2010 | Sisk |
| 2010/0327576 A1 | 12/2010 | Linhorst et al. |
| 2011/0062706 A1 | 3/2011 | Henry |
| 2011/0154646 A1 | 6/2011 | Hagiya |
| 2011/0254268 A1 | 10/2011 | Johnson et al. |
| 2012/0074689 A1 | 3/2012 | Petersen et al. |
| 2012/0098259 A1 | 4/2012 | Sarkisian et al. |
| 2012/0205909 A1 | 8/2012 | Bird |
| 2012/0235405 A1 | 9/2012 | Dole et al. |
| 2012/0256415 A1 | 10/2012 | Dole |
| 2012/0306118 A1 | 12/2012 | Hayashi et al. |
| 2013/0181446 A1 | 7/2013 | Le Clinche |
| 2013/0200610 A1 | 8/2013 | Cygler, III et al. |
| 2013/0327415 A1 | 12/2013 | Camp, Jr. et al. |
| 2014/0327238 A1 | 11/2014 | Bowman |
| 2015/0021911 A1 | 1/2015 | Bowman et al. |
| 2015/0176728 A1 | 6/2015 | Bowman |
| 2015/0204471 A1 | 7/2015 | Sato |
| 2016/0084420 A1 | 3/2016 | Barrientos |
| 2017/0184226 A1 | 6/2017 | Cuvo et al. |
| 2017/0328500 A1 | 11/2017 | Bowman et al. |
| 2017/0328507 A1 | 11/2017 | Sith et al. |
| 2018/0163905 A1 | 6/2018 | Ohnemus et al. |
| 2018/0163906 A1 | 6/2018 | Ohnemus et al. |
| 2019/0032824 A1 | 1/2019 | McNamara et al. |
| 2019/0032825 A1 | 1/2019 | McNamara et al. |

FOREIGN PATENT DOCUMENTS

| | | |
|---|---|---|
| CN | 105423015 | 3/2016 |
| CN | 105473923 | 4/2016 |
| DE | 3111997 | 10/1982 |
| DE | 3443942 A1 | 6/1985 |
| DE | 3443943 A1 | 6/1985 |
| DE | 19532356 | 4/1996 |
| DE | 10006029 | 8/2001 |
| EP | 0462454 | 12/1991 |
| EP | 2113701 A1 | 11/2009 |
| EP | 1840439 | 6/2010 |
| EP | 2487397 | 8/2012 |
| FR | 2683017 A1 | 4/1993 |
| FR | 2747453 | 4/1997 |
| FR | 2921985 | 3/2013 |
| GB | 2098297 A | 11/1982 |
| GB | 2211255 A | 6/1989 |
| JP | S524772 B1 | 2/1993 |
| JP | 07269764 | 10/1995 |
| JP | 2001-304468 A | 10/2001 |
| JP | 2006250247 | 9/2006 |
| JP | 2007537414 | 12/2007 |
| JP | 2011163474 | 8/2011 |
| JP | 2012189147 | 10/2012 |
| KR | 10-0315861 B1 | 11/2001 |
| KR | 10-2009-0007813 A | 1/2009 |
| KR | 10-2009-0066767 A | 6/2009 |
| KR | 10-0904419 B1 | 6/2009 |
| WO | WO-97/03811 A1 | 2/1997 |
| WO | 2005114023 | 12/2005 |
| WO | 2013115963 | 8/2013 |

OTHER PUBLICATIONS

Copenheaver, Blane R.; Written Opinion from counterpart International Patent Application No. PCT/US2017/032580, dated Jul. 20, 2017, pp. 1-5, United States Patent and Trademark Office as Searching Authority, Alexandria, Virginia USA.

No Author; Coupling; Dudeco, JJ Coupling Product Catalog; Date Unknown; pp. 1-8; Korea (16 pages).

* cited by examiner

FITTING HAVING TABBED RETAINER AND OBSERVATION APERTURES

CROSS REFERENCE TO RELATED APPLICATION

This application is based upon and claims priority to U.S. Provisional Application No. 62/336,893 filed May 16, 2016 and hereby incorporated by reference.

FIELD OF THE INVENTION

This invention relates to fittings for joining plain end pipe elements.

BACKGROUND

Mechanical fittings for joining pipe elements together end-to-end comprise interconnectable housing portions that are positionable circumferentially surrounding the end portions of pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Toothed retainers may be used to form projections for fittings connecting plain end pipe elements. When the retainers are properly oriented in the housing portions engagement between the teeth and the pipe elements provides mechanical restraint to the joint and ensures that the pipe elements remain coupled even under high internal pressure and/or external forces. The housings also define annular channels that receive ring gaskets, typically elastomeric rings which engage the ends of each pipe element and cooperate with the housing portions and the pipe elements to provide a fluid tight seal. The housing portions have connection members, typically in the form of lugs which are arranged in facing relation. The lugs are adapted to receive fasteners, such as nuts and bolts, which are adjustably tightenable to draw the housing portions toward one another.

Some retainers use teeth that are angularly oriented with respect to a radius from the center of the pipe elements. The proper angular orientation allows the teeth to be "self-actuating", i.e., the mechanical engagement between the teeth and the pipe elements increases with increasing force on the pipe elements trying to draw them out of the fitting. Hence, the force resisting withdrawal increases with the applied force that would otherwise cause withdrawal. However, if such retainers are oriented improperly, for example, if the retainer is reversed within the fitting, then it will not provide sufficient mechanical engagement against withdrawal and the pipe elements will not be securely held within the fitting. For fittings having retainers it may be difficult to determine if the retainers are properly oriented before the joint is pressurized. It would be advantageous if pipe fittings could be designed so that, during assembly of the joint, there is an indication that the retainer was not properly oriented during assembly of the joint.

SUMMARY

The invention concerns a fitting for connecting a plurality of pipe elements. In one example embodiment the fitting comprises at least first and second housing portions attached to one another and defining at least first and second receptacles of said plurality of receptacles for receiving the pipe elements. In an example embodiment the fitting may comprise no more than two receptacles. The first and second receptacles respectively surround first and second axes. The first axis is oriented coaxially with the first receptacle, and the second axis oriented coaxially with the second receptacle. The first axis is angularly oriented with respect to the second axis. By way of example each of the housing portions comprises at least first and second channels positioned respectively within the first and second receptacles. The first channel faces the first axis, and the second channel faces the second axis. Each of the channels has a first floor and a second floor. The first floor has a greater radius of curvature than the second floor. At least first and second retainers are positioned respectively in the first and second channels. In an example embodiment each of the retainers comprises a band having oppositely disposed ends. A plurality of teeth are positioned along one edge of the band. The teeth of the first retainer project toward the first axis, and the teeth of the second retainer project toward the second axis. By way of further example at least one tab is positioned along an opposite edge of the band. The band overlies the first floor, the tab overlies the second floor when the retainers are positioned within the channels. An example embodiment may have a plurality of tabs.

By way of a further example the fitting comprises a third channel positioned adjacent to the first receptacle. The third channel faces the first axis. A fourth channel is positioned adjacent to the second receptacle. The fourth channel faces the second axis. First and second ring seals are positioned respectively within the third and fourth channels. The ring seals have an inner surface sized to receive the pipe elements and an outer surface sized to support the housing portions in spaced apart relation sufficient to permit insertion of the pipe elements into the receptacles while said housing portions are attached to one another.

In an example embodiment the retainer bands are sized to cooperate with the ring seals to support the housing portions in the spaced apart relation. In another example a tube extends between the first and second ring seals. By way of further example the tube is intergrally formed with the ring seals.

In a particular example embodiment the teeth of the first retainer are oriented angularly with respect to a radius extending from the first axis. Further by way of example the teeth of the second retainer are oriented angularly with respect to a radius extending from the second axis. In another example embodiment the tab or tabs of the first retainer are oriented perpendicular to a radius extending from the first axis. Further by way of example the tab or tabs of the second retainer are oriented perpendicular to a radius extending from the second axis. In an example embodiment the tab or tabs of the first retainer project toward the third channel and the tab or tabs of the second retainer project toward the fourth channel.

In a particular example embodiment the fitting further comprises a first attachment member positioned adjacent to the first receptacle, a second attachment member positioned adjacent to the second receptacle and a third attachment member positioned adjacent to both the first and second receptacles. In this example the attachment members are adjustably tightenable for drawing the first and second housing portions toward one another.

By way of example, the attachment members comprise first and second lugs positioned respectively on the first and second housing portions. The first and second lugs are in facing relation. A fastener extends between the first and second lugs. Tightening of the fastener draws the housing portions toward one another.

A specific example embodiment further comprises a first aperture in the first receptacle. The first aperture provides a line of sight transverse to the first axis. The first aperture is positioned between the first and second housing portions in an example embodiment. Further by way of example the first aperture is aligned with the first channel. Another example embodiment comprises a second aperture in the second receptacle. The second aperture provides a line of sight transverse to the second axis. In a specific example embodiment the second aperture is positioned between the first and second housing portions. Further by way of example, the second aperture is aligned with the second channel.

The invention also encompasses another embodiment of a fitting for connecting pipe elements. By way of example the fitting comprises first and second housing portions attached to one another defining at least first and second receptacles for receiving the pipe elements. The first and second receptacles respectively surround first and second axes. The first axis is oriented coaxially with the first receptacle, the second axis is oriented coaxially with the second receptacle. The first axis is angularly oriented with respect to the second axis. Each of the housing portions comprises first and second channels positioned respectively within the first and second receptacles. The first channel faces the first axis, the second channel faces the second axis. First and second retainers are positioned respectively in the first and second channels. Each of the retainers comprises a band having oppositely disposed ends. A plurality of teeth are positioned along one edge of the band. The teeth of the first retainer project toward the first axis, the teeth of the second retainer project toward the second axis. A first aperture is positioned in the first receptacle. The first aperture provides a line of sight transverse to the first axis.

In an example embodiment the first aperture is positioned between the first and second housing portions. Further by way of example the first aperture is aligned with the first channel.

In another example embodiment a second aperture is positioned in the second receptacle. The second aperture provides a line of sight transverse to the second axis. In a particular example embodiment, the second aperture is positioned between the first and second housing portions. In another example, the second aperture is aligned with the second channel.

An example fitting embodiment further comprises a third channel positioned adjacent to the first receptacle. The third channel faces the first axis. A fourth channel is positioned adjacent to the second receptacle. The fourth channel faces the second axis. First and second ring seals are positioned respectively within the third and fourth channels. The ring seals have an inner surface sized to receive the pipe elements and an outer surface sized to support the housing portions in spaced apart relation sufficient to permit insertion of the pipe elements into the receptacles while said housing portions are attached to one another.

In a particular example embodiment the retainer bands are sized to cooperate with the ring seals to support the housing portions in the spaced apart relation.

The invention also encompasses a retainer positionable within a fitting for joining pipe elements. In one example embodiment the retainer comprises an arcuate band having oppositely disposed ends. The band surrounds an axis coaxial with the band. A plurality of teeth are positioned along one edge of the band. The teeth project toward the axis. At least one tab, but in another example embodiment, a plurality of tabs are positioned along an opposite edge of the band. The tab or tabs project in a direction away from the teeth. The tab or tabs are offset from the band toward the axis.

In an example embodiment the teeth are oriented angularly with respect to a radius extending from the first axis. By way of further example the tab or tabs are oriented perpendicular to a radius extending from the first axis.

The invention further encompasses a method of joining pipe elements. In one example embodiment the method comprises:
    inserting at least a first pipe element into a first receptacle defined by first and second housing portion attached to one another end to end in spaced relation sufficient to permit insertion of the first pipe element; and
    observing, through a first aperture in at least one of the housing portions, whether or not the first pipe element is properly seated within the first receptacle.

The example method may further comprise:
    inserting at least a second pipe element into a second receptacle defined by the first and second housing portions attached to one another end to end in spaced relation sufficient to permit insertion of the second pipe element; and
    observing, through a second aperture in at least one of the housing portions, whether or not the second pipe element is properly seated within the central space.

Also by way of example, the method may further comprise:
    adjusting positions of the pipe elements within the receptacles if the pipe elements are not properly seated within the receptacles; and
    drawing the housing portions toward one another and into engagement with the pipe elements once the pipe elements are observed to be properly seated within the receptacles.

DETAILED DESCRIPTION

Figure 1:
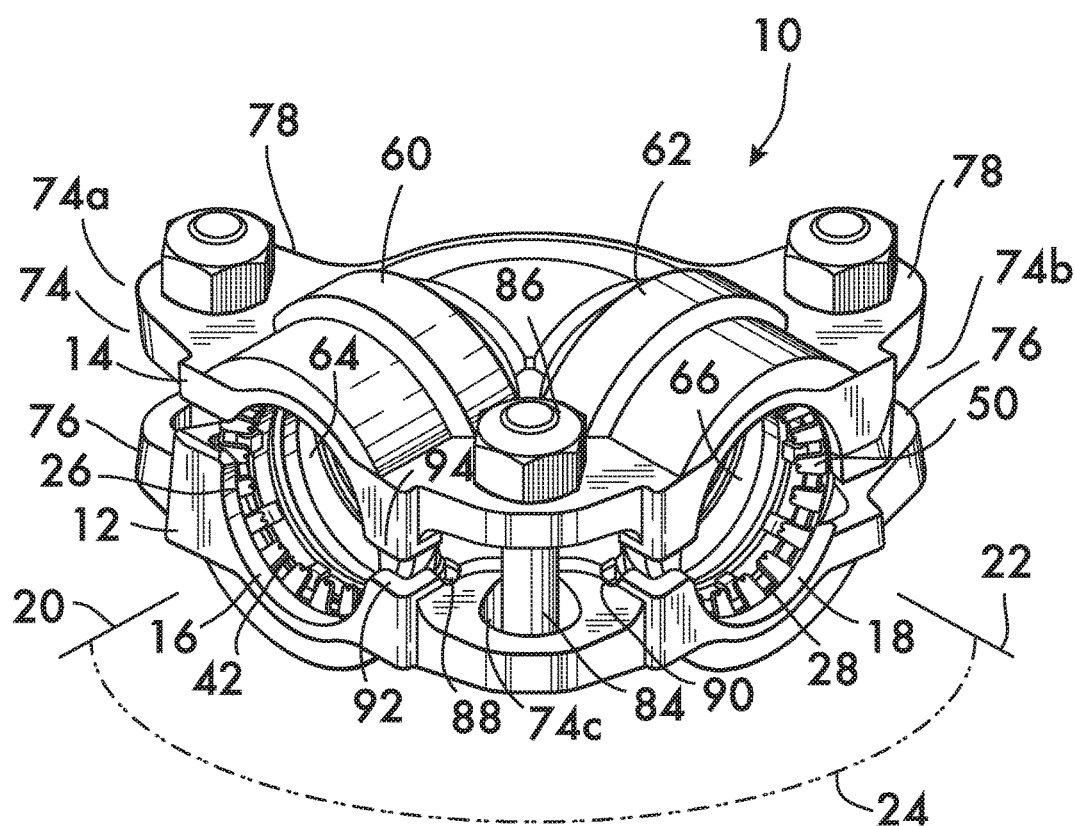
FIG. 1 is an isometric view of an example fitting according to the invention shown in a pre-assembled state.
Figure 2:
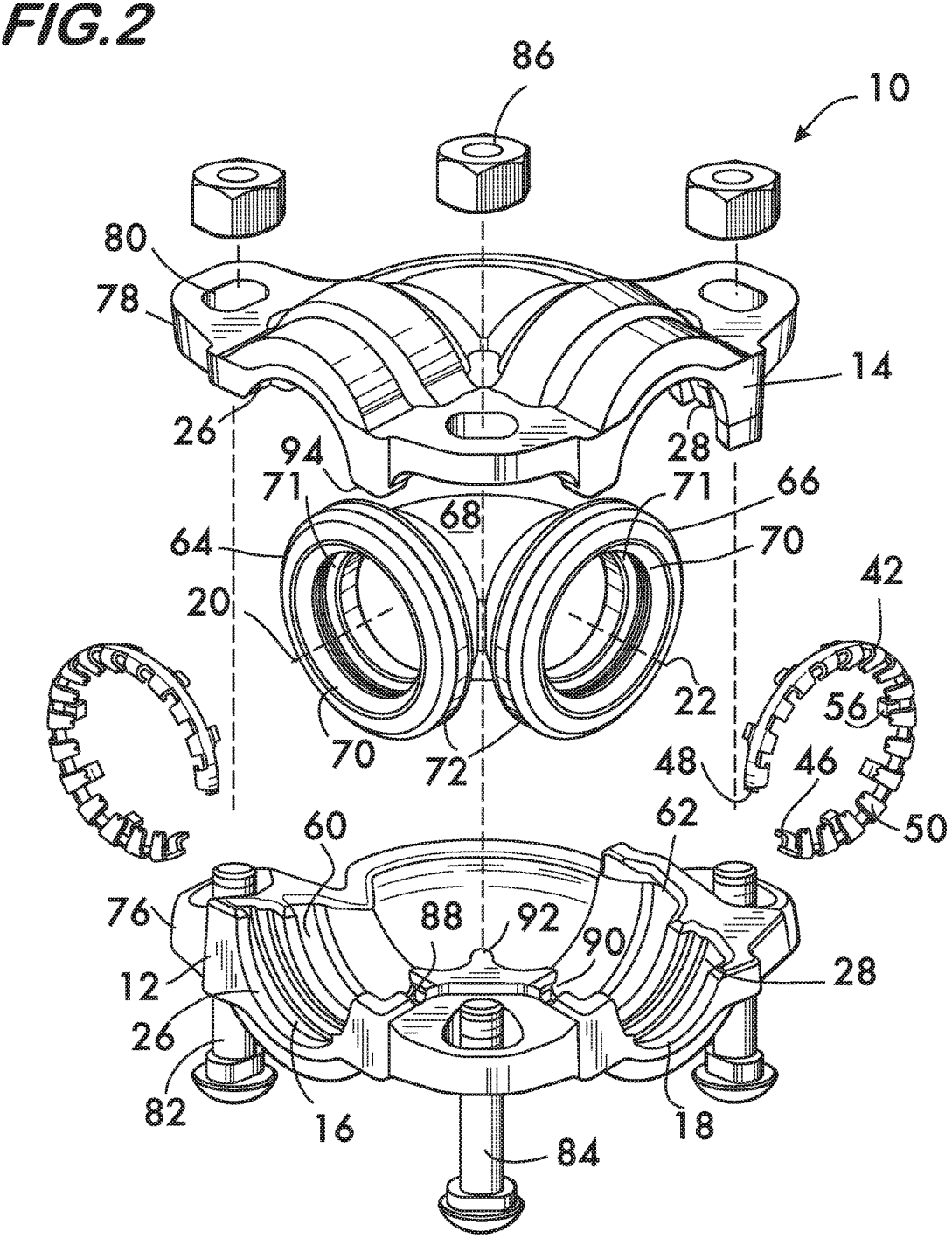
FIG. 2 is an exploded isometric view of the fitting shown in FIG. 1.

FIGS. 1 and 2 show an example fitting 10 for connecting pipe elements according to the invention. The example fitting 10 comprises first and second housing portions 12 and 14 attached to one another to define first and second receptacles 16 and 18 which receive the pipe elements (described below). The first receptacle 16 surrounds a first axis 20, first axis 20 being oriented coaxially with the first receptacle. The second receptacle 18 surrounds a second axis 22, second axis 22 being oriented coaxially with the second receptacle. The first and second axes 20 and 22 are oriented angularly with respect to one another. An orientation angle 24 of about 90° is illustrated, with other orientation angles being feasible.

Figure 3:
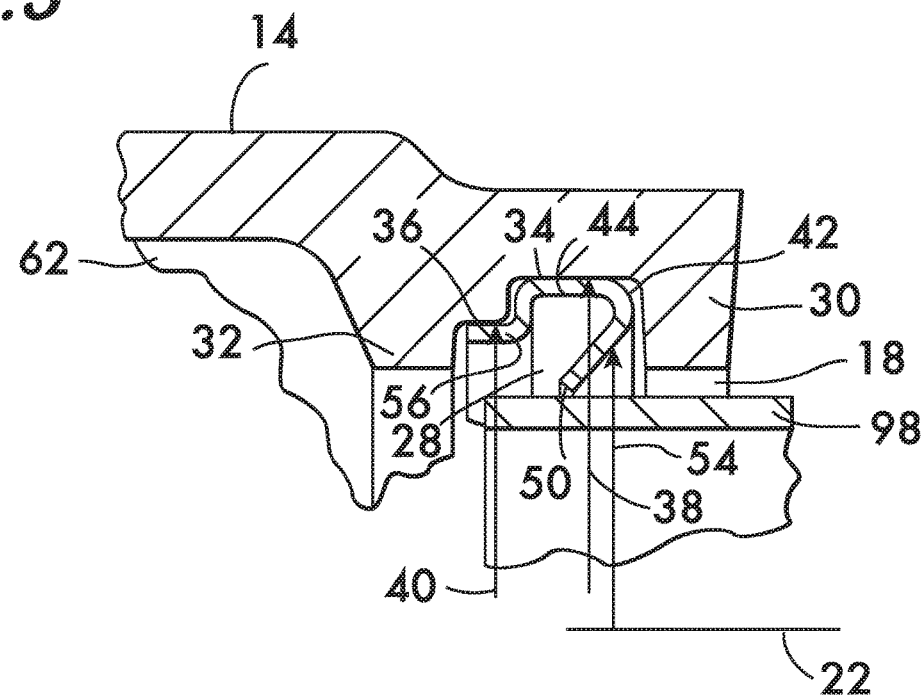
FIG. 3 is a partial sectional view of a portion of the fitting shown in FIG. 1.

As further shown in FIGS. 1 and 2, a first channel 26 is positioned within the first receptacle 16 and a second channel 28 is positioned within the second receptacle 18. The first channel 26 faces the first axis 20 and the second channel 28 faces the second axis 22. As shown in FIG. 3, each channel 26 and 28 (28 shown) is defined by sidewalls 30 and 32 positioned in spaced relation from one another. Each channel further comprises a first floor 34 and a second floor 36 positioned between the sidewalls 30 and 32. First floor 34 has a greater radius of curvature 38 than the radius of curvature 40 of the second floor 36. In this example embodiment, the first floors 34 are positioned adjacent to the outermost sidewalls 30.

As further shown in FIGS. 1-3, the channels 26 and 28 each receive a respective retainer 42. Retainer 42 is shown in detail in FIG. 4 and comprises an arcuate band 44 having oppositely disposed ends 46 and 48. Band 44 thus forms a "split ring" which, when compressed radially, will deform to a smaller radius of curvature. A plurality of teeth 50 are positioned along one edge 52 of band 44. Teeth 50 project from band 44 toward one of the axes 20 or 22 depending upon which receptacle the retainer 42 occupies. FIG. 3 shows the retainer 42 within the second receptacle 18, the teeth 50 of the retainer being angularly oriented with respect to radius 54 extending from the second axis 22, which is coaxial with the second receptacle. The angular orientation of the teeth is advantageous for retaining pipe elements as described below.

Figure 4:
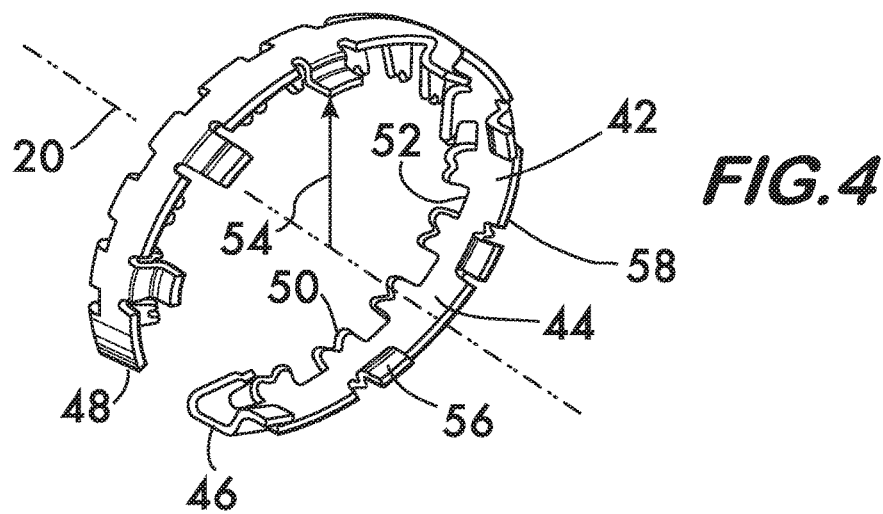
FIG. 4 is an isometric view of an example retainer used in the fitting shown in FIG. 1.
Figure 5:
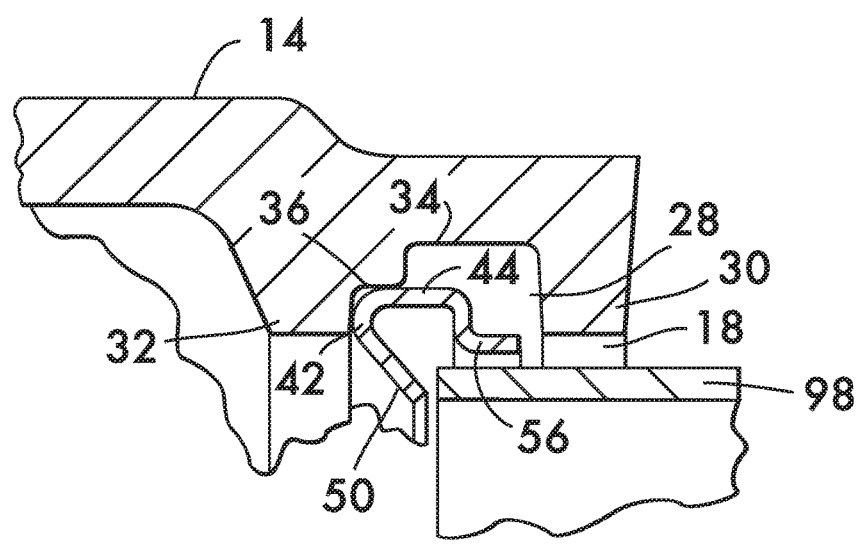
FIG. 5 is a partial sectional view of a portion of the fitting shown in FIG. 1.

As further shown in FIG. 4, at least one, but in this example embodiment, a plurality of tabs 56 are positioned along an edge 58 of band 44 oppositely disposed from edge 52. As shown in FIG. 3, tabs 56 are oriented substantially perpendicular to the radius 54 and are offset from the band 44 toward axes 20 or 22 in the direction which teeth 50 project. This offset of tabs 56 permits the tabs to overlie the second floor 36, and the band 44 to overlie the first floor 34, when retainers 42 are properly received within respective channels 26 and 28 as shown in FIGS. 2 and 3. Proper assembly of the retainers 42 within the channels 26 and 28 permits pipe elements to be inserted into a pre-assembled fitting 10 as described below. However, as shown in FIG. 5, the channels 26 and 28 (28 shown) and the retainers 42 are sized such that if the fitting 10 is improperly assembled with the band 44 overlying the second floor 36 and the tabs 56 overlying the first floor 34 the teeth 50 resist insertion of a pipe element into the fitting, also described below.

Figure 2A:
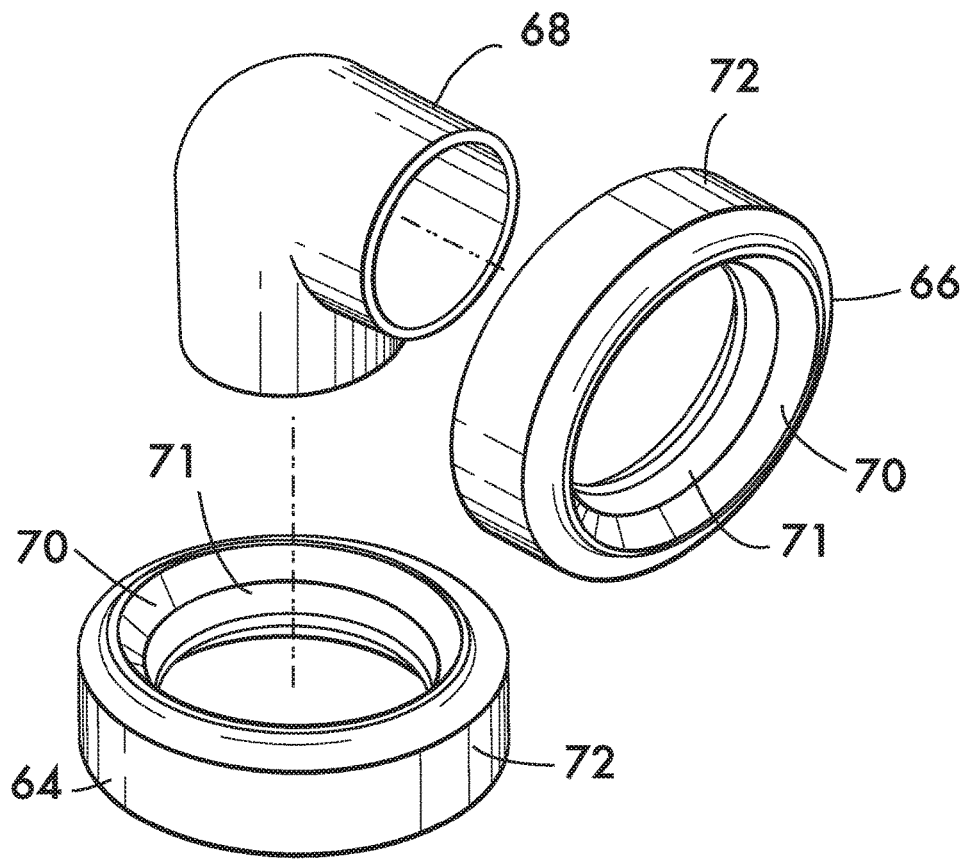
FIG. 2A is an exploded isometric view of a component used in the fitting shown in FIG. 1.

FIGS. 1 and 2 further illustrate third and fourth channels 60 and 62 defined by the housing portions 12 and 14. The third channel 60 is positioned adjacent to the first receptacle 16 and faces first axis 20. The fourth channel 62 is positioned adjacent to the second receptacle 18 and faces the second axis 22. In this example the tabs 56 of the retainer 42 in the first channel 26 project axially (along axis 20) toward the third channel 60 and the tabs 56 of the retainer 42 in the second channel 28 project axially (along axis 22) toward the fourth channel 62 (see FIG. 3). First and second ring seals 64 and 66 are positioned respectively within the third and fourth channels 60 and 62. The ring seals ensure a fluid tight joint between the fitting 10 and the pipe elements being connected. The ring seals are advantageously formed of a resilient, elastic material such as EPDM or other rubber compounds. A tube 68 extends between the ring seals 64 and 66. Tube 68 ensures a fluid tight path between the housing portions 12 and 14. Tube 68 may be integrally formed with the ring seals 64 and 68 as shown in FIG. 2, or, as shown in FIG. 2A, it may be separate from them. When integrally formed with the ring seals 64 and 66 the tube 68 is the same resilient elastic material as the ring seals. When the tube 68 is a separate component (FIG. 2A) it is advantageous to form the tube from a stiff polymer, such as polyvinyldene fluoride. The more rigid tube allows the separate ring seals to form fluid tight seals between the inner surfaces 70 and the tube 68 when the ring seals are compressed between the housing portions 12 and 14 as described below.

As shown in FIGS. 2 and 2A, ring seals 64 and 66 each have inner surfaces 70 sized to receive the pipe elements upon insertion into the receptacles 16 and 18 as described below. Each ring seal may also comprise a pipe stop 71 positioned adjacent to the inner surfaces 70. Pipe stops 71 on respective ring seals 64 and 66 project toward respective axes 20 and 22 and engage the ends of properly seated pipe elements as described below. In some embodiments each ring seal 64 and 66 also has an outer surface 72 sized to support the housing portions 12 and 14 in spaced apart relation sufficient to permit pipe elements to be inserted into the receptacles 16 and 18 without disassembling the fitting from the preassembled state shown in FIG. 1, i.e., while the housing portions 12 and 14 are attached to one another. Bands 44 of retainers 42 may also be sized to cooperate with the ring seals 64 and 66 to support the housing portions 12 and 14. It is advantageous if the ring seals 64 and 66 and bands 44 have sufficient stiffness to support the housing portions in spaced apart relation during shipping, handling and installation.

As illustrated in FIG. 1, housing portions 12 and 14 are attached to one another using a plurality of attachment members 74. The example embodiment of fitting 10 comprises three attachment members, a first attachment member 74a positioned adjacent to the first receptacle 16, a second attachment member 74b positioned adjacent to the second receptacle 18, and a third attachment member 74c positioned adjacent to both the first and second receptacles 16 and 18. In this example embodiment, each attachment member comprises first and second lugs 76, 78 positioned respectively on the first and second housing portions 12 and 14. The lugs 76, 78 are in facing relation and, as shown in FIG. 2, have holes 80 which receive fasteners 82 that extend between the lugs. The fastener in this example comprises a bolt 84 and a nut 86, and tightening of the bolt and nut draws the housing portions toward one another to establish a fluid tight connection between the pipe elements as described below.

As shown in FIGS. 1 and 2, the housing portions 12 and 14 further define first and second apertures 88 and 90 in fitting 10. The apertures 88 and 90 are located in the receptacles 16 and 18 and provide a line of sight, respectively, transverse to the first and second axes 20 and 22. The apertures 88 and 90 permit a technician to visually confirm that a retainer is present and determine that a pipe element has been installed at least past the retainer 42. In the example fitting of embodiment 10 the apertures 88 and 90 are formed between the first and second housing portions 12 and 14 at the interfacing surfaces 92 and 94 where the housing portions 12 and 14 meet. It is convenient to have multiple apertures 88, 90 in each receptacle.

The fitting according to the invention is not limited to two receptacles. For example, in addition to the elbow fitting shown, the fitting may have a third receptacle and take the form of a "Tee" or a "Y" type fitting.

Figure 6:
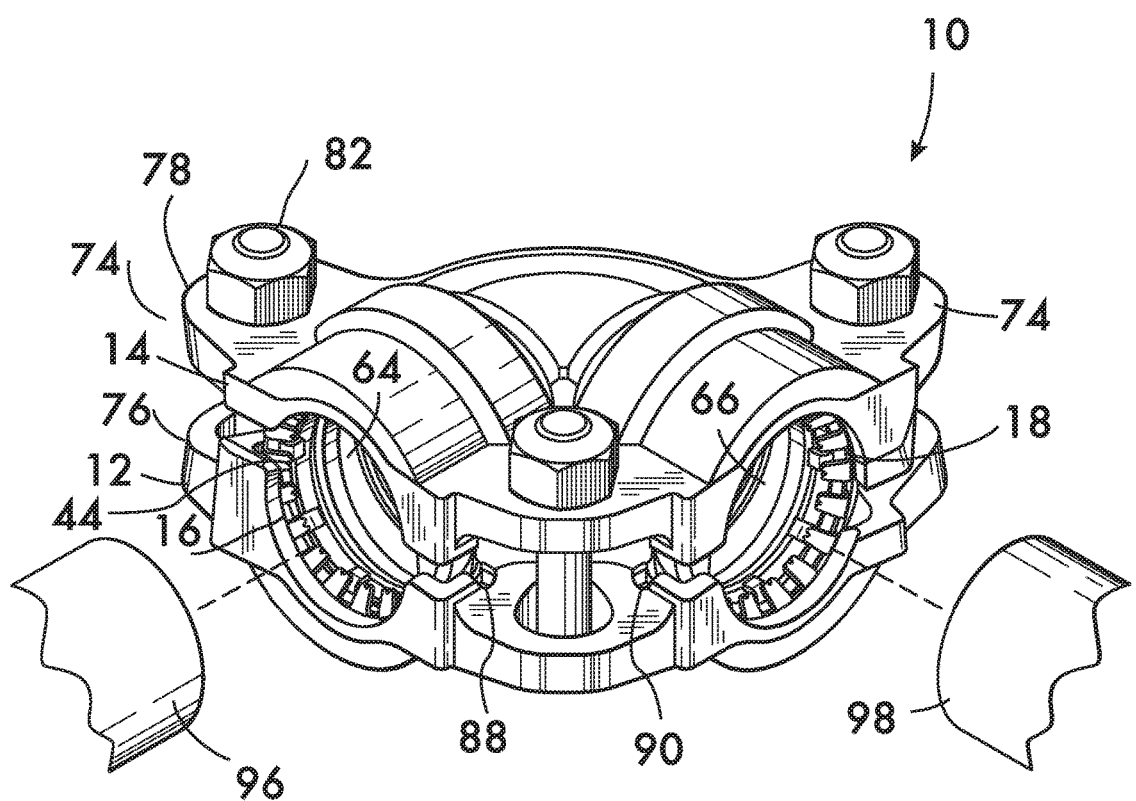
FIG. 6 is an isometric view illustrating use of the fitting shown in FIG. 1.
Figure 7:
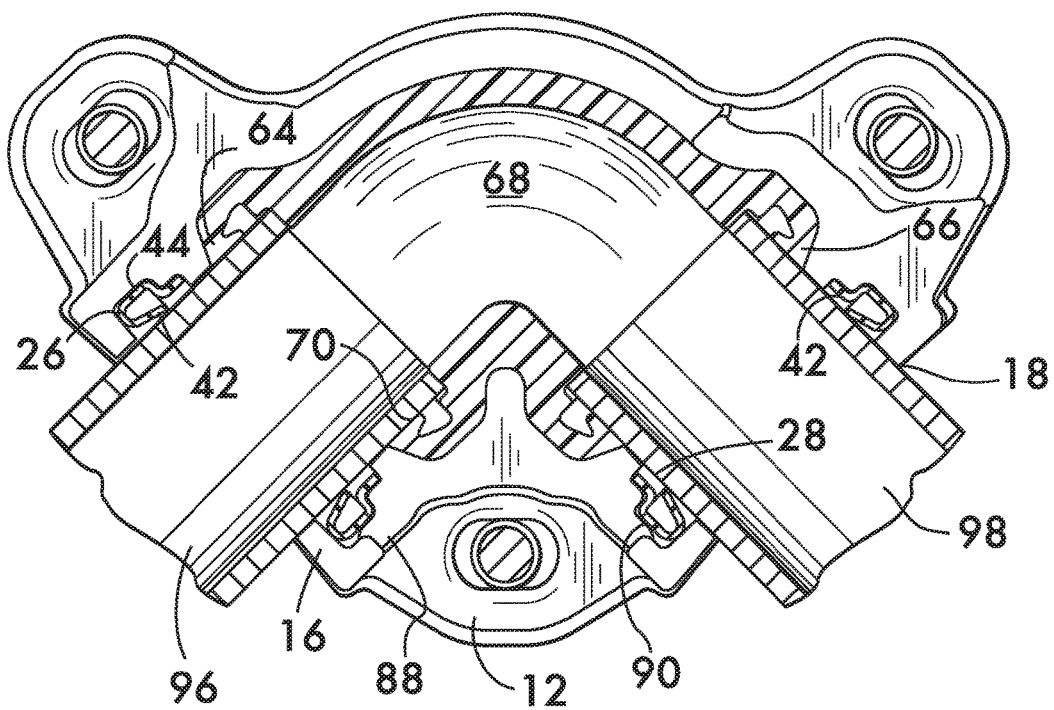
FIG. 7 is a sectional view illustrating use of the fitting shown in FIG. 1.

Operation of the example fitting 10 is illustrated in FIGS. 6 and 7. As shown in FIG. 6, fitting 10 is provided in the pre-assembled state, with the housing portions 12 and 14 attached to one another using the attachment members 74, in this example fasteners 82 and lugs 76 and 78. Housing portions 12 and 14 are supported in the pre-assembled state by ring seals 64 and 66, which have outer surfaces 72 (see FIG. 2) that are sized such that they support the housing portions 12 and 14 in spaced apart relation as shown in FIG. 6. One or more of the bands 44 may cooperate with the ring seals to help support the housing portions 12 and 14. The separation of the housing portions 12 and 14, when supported by ring seals 64 and 66 and/or bands 44, is sufficient to permit insertion of pipe elements 96 and 98 into their respective receptacles 16 and 18 when the coupling is in the pre-assembled state as illustrated in FIG. 6. It is advantageous that ring seals 64 and 66 and/or the bands 44 have sufficient stiffness to support the housing portions 12 and 14 in spaced relation during shipping and handling and during installation. With reference to FIG. 3, as pipe element 98 is inserted into receptacle 18, the retainer 42, being properly oriented with band 44 overlying the first floor 34 and the tabs 56 overlying second floor 36, has a radius of curvature which allows the pipe element to clear teeth 50 which project toward the axis 22 when the fitting 10 is in the preassembled state. However, if, as shown in FIG. 5, the retainer 42 is oriented improperly, with the band 44 overlying the second floor 36, the retainer's radius of curvature is smaller and teeth 50 effectively resist insertion of the pipe element 98 into the receptacle 18 with the segments 12 and 14 in spaced apart relation in the pre-assembled state. Aperture 90 in receptacle 18 permits inspection post assembly, and allows one to visually determine if retainer 42 is present and if the pipe element is installed at least past the retainer. Cooperation between the retainer 42, its tabs 56, teeth 50, and the first and second floors 34 and 36 of channels 26 and 28 prevent improper assembly of a pipe joint using fitting 10. If the pipe elements 96 and 98 could be inserted with the retainer teeth 50 facing in the wrong direction (FIG. 5) then there would be less effective mechanical engagement to prevent impaired joint performance.

Once both pipe elements 96 and 98 are inserted into their respective receptacles 16 and 18 engaging the pipe stops 71 and respective inner surfaces 70 of respective ring seals 64 and 66 the fasteners 82 are tightened. Tightening the fasteners 82 draws the housing portions 12 and 14 toward one another, and, as shown in FIG. 7, the segments compress the ring seals 64 and 66 and the retainers 42 against the pipe elements to form a fluid tight seal and mechanical engagement between the teeth 50 and the outer surfaces of pipe elements 96 and 98. The advantage of the angular orientation of teeth 50 is readily apparent, as it causes the teeth to be self-actuating and resist axial forces which would tend to draw the pipe elements out of engagement with the fitting 10.

Operation of the use of the example fitting 10 illustrates an example method of joining pipe elements. In this example the method comprises:

inserting at least a first pipe element into a first receptacle defined by first and second housing portion attached to one another end to end in spaced relation sufficient to permit insertion of the first pipe element; and observing, through a first aperture in at least one of the housing portions, whether or not the first pipe element is properly seated within the first receptacle.

The example method may further comprise:

inserting at least a second pipe element into a second receptacle defined by the first and second housing portions attached to one another end to end in spaced relation sufficient to permit insertion of the second pipe element; and observing, through a second aperture in at least one of the housing portions, whether or not the second pipe element is properly seated within the central space.

By way of example the method may further comprise:

adjusting positions of the pipe elements within the receptacles if the pipe elements are not properly seated within the receptacles; and drawing the housing portions toward one another and into engagement with the pipe elements once the pipe elements are observed to be properly seated within the receptacles.

Fittings according to the invention are expected to improve the efficiency and reliability of forming pipe joints using plain end pipe elements.

What is claimed is:

1. A fitting for connecting a plurality of pipe elements, said fitting comprising:

first and second housing portions attached to one another and defining a plurality of receptacles for receiving said pipe elements, at least first and second receptacles of said plurality of receptacles respectively surrounding first and second axes, said first axis oriented coaxially with said first receptacle, said second axis oriented coaxially with said second receptacle, said first axis being angularly oriented with respect to said second axis, each of said housing portions comprising:

at least first and second channels positioned respectively within said first and second receptacles, said first channel facing said first axis, said second channel facing said second axis, each of said first and second channels having a first floor and a second floor, said first floor having a greater radius of curvature than said second floor;

at least first and second retainers positioned respectively in said first and second channels, each of said retainers comprising a band having oppositely disposed ends, a plurality of teeth being positioned along one edge of said band, said teeth of said first retainer projecting toward said first axis, said teeth of said second retainer projecting toward said second axis, and at least one tab being positioned along an opposite edge of said band, said band overlying said first floor, said at least one tab overlying said second floor when said retainers are positioned within said channels.

2. The fitting according to claim 1, comprising no more than two of said receptacles.

3. The fitting according to claim 1, further comprising a plurality of said tabs.

4. The fitting according to claim 1, further comprising:

a third channel positioned adjacent to said first receptacle, said third channel facing said first axis;

a fourth channel positioned adjacent to said second receptacle, said fourth channel facing said second axis;

first and second ring seals positioned respectively within said third and fourth channels, said ring seals having an inner surface sized to receive said pipe elements and an outer surface sized to support said housing portions in spaced apart relation sufficient to permit insertion of said pipe elements into said receptacles while said housing portions are attached to one another.

5. The fitting according to claim 4, wherein said retainer bands are sized to cooperate with said ring seals to support said housing portions in said spaced apart relation.

6. The fitting according to claim 4, further comprising a tube extending between said first and second ring seals.

7. The fitting according to claim 6, wherein said tube is integrally formed with said ring seals.

8. The fitting according to claim 4, wherein said at least one tab of said first retainer projects toward said third channel and said at least one tab of said second retainer projects toward said fourth channel.

9. The fitting according to claim 1, wherein said teeth of said first retainer are oriented angularly with respect to a radius extending from said first axis.

10. The fitting according to claim 1, wherein said teeth of said second retainer are oriented angularly with respect to a radius extending from said second axis.

11. The fitting according to claim 1, wherein said at least one tab of said first retainer is oriented perpendicularly to a radius extending from said first axis.

12. The fitting according to claim 1, wherein said at least one tab of said second retainer is oriented perpendicular to a radius extending from said second axis.

13. The fitting according to claim 1, further comprising:
a first attachment member positioned adjacent to said first receptacle;
a second attachment member positioned adjacent to said second receptacle;
a third attachment member positioned adjacent to both said first and second receptacles, said attachment members being adjustably tightenable for drawing said first and second housing portions toward one another.

14. The fitting according to claim 13, wherein said attachment members comprise:
first and second lugs positioned respectively on said first and second housing portions, said first and second lugs being in facing relation;
a fastener extending between said first and second lugs, tightening of said fastener drawing said housing portions toward one another.

15. The fitting according to claim 1, further comprising a first aperture in said first receptacle, said first aperture providing a line of sight transverse to said first axis.

16. The fitting according to claim 15, wherein said first aperture is positioned between said first and second housing portions.

17. The fitting according to claim 16, further comprising a second aperture in said second receptacle, said second aperture providing a line of sight transverse to said second axis.

18. The fitting according to claim 17, wherein said second aperture is positioned between said first and second housing portions.

19. The fitting according to claim 17, wherein said second aperture is aligned with said second channel.

20. The fitting according to claim 15 wherein said first aperture is aligned with said first channel.

21. A fitting for connecting pipe elements, said fitting comprising:
first and second housing portions attached to one another and defining at least first and second receptacles for receiving said pipe elements, said first and second receptacles respectively surrounding first and second axes, said first axis oriented coaxially with said first receptacle, said second axis oriented coaxially with said second receptacle, said first axis being angularly oriented with respect to said second axis, each of said housing portions comprising:
first and second channels positioned respectively within said first and second receptacles, said first channel facing said first axis, said second channel facing said second axis;
first and second retainers positioned respectively in said first and second channels, each of said retainers comprising a band having oppositely disposed ends, a plurality of teeth being positioned along one edge of said band, said teeth of said first retainer projecting toward said first axis, said teeth of said second retainer projecting toward said second axis; and
a first aperture in said first receptacle, said first aperture providing a line of sight transverse to said first axis.

22. The fitting according to claim 21, wherein said first aperture is positioned between said first and second housing portions.

23. The fitting according to claim 21 wherein said first aperture is aligned with said first channel.

24. The fitting according to claim 21, further comprising a second aperture in said second receptacle, said second aperture providing a line of sight transverse to said second axis.

25. The fitting according to claim 24, wherein said second aperture is positioned between said first and second housing portions.

26. The fitting according to claim 24, wherein said second aperture is aligned with said second channel.

27. The fitting according to claim 21, wherein:
each of said channels has a first floor and a second floor, said first floor having a greater radius of curvature than said second floor;
at least a first tab being positioned along an edge of said band of said first retainer opposite to said teeth of said first retainer;
at least a second tab being positioned along an edge of said band of said second retainer opposite to said teeth of said second retainer; wherein
said band of said first retainer overlies said first floor of said first channel, said first tab overlies said second floor of said first channel, and, said band of said second retainer overlies said first floor of said second channel, said second tab overlies said second floor of said second channel.

28. The fitting according to claim 27, further comprising a plurality of said first tabs and a plurality of said second tabs.

29. The fitting according to claim 27, further comprising:
a third channel positioned adjacent to said first receptacle, said third channel facing said first axis;
a fourth channel positioned adjacent to said second receptacle, said fourth channel facing said second axis;
first and second ring seals positioned respectively within said third and fourth channels, said ring seals having an inner surface sized to receive said pipe elements and an outer surface sized to support said housing portions in spaced apart relation sufficient to permit insertion of said pipe elements into said receptacles while said housing portions are attached to one another.

30. The fitting according to claim 29, wherein said retainer bands are sized to cooperate with said ring seals to support said housing portions in said spaced apart relation.

31. The fitting according to claim 29, further comprising a tube extending between said first and second ring seals.

32. The fitting according to claim 31, wherein said tube is integrally formed with said ring seals.

33. The fitting according to claim 29, wherein said first tab projects toward said third channel and said second tab projects toward said fourth channel.

34. The fitting according to claim 27, wherein said first tab is oriented perpendicular to a radius extending from said first axis.

35. The fitting according to claim 34, wherein said second tab is oriented perpendicular to a radius extending from said second axis.

36. The fitting according to claim 21, wherein said teeth of said first retainer are oriented angularly with respect to a radius extending from said first axis.

37. The fitting according to claim 36, wherein said teeth of said second retainer are oriented angularly with respect to a radius extending from said second axis.

38. The fitting according to claim 21, further comprising:
a first attachment member positioned adjacent to said first receptacle;
a second attachment member positioned adjacent to said second receptacle;
a third attachment member positioned adjacent to both said first and second receptacles, said attachment members being adjustably tightenable for drawing said first and second housing portions toward one another.

39. The fitting according to claim 38, wherein said attachment members comprise:
first and second lugs positioned respectively on said first and second housing portions, said first and second lugs being in facing relation;
a fastener extending between said first and second lugs, tightening of said fastener drawing said housing portions toward one another.

40. The fitting according to claim 21, further comprising a first aperture in said first receptacle, said first aperture providing a line of sight transverse to said first axis.

41. The fitting according to claim 40, wherein said first aperture is positioned between said first and second housing portions.

42. The fitting according to claim 41, further comprising a second aperture in said second receptacle, said second aperture providing a line of sight transverse to said second axis.

43. The fitting according to claim 42, wherein said second aperture is positioned between said first and second housing portions.

44. The fitting according to claim 42, wherein said second aperture is aligned with said second channel.

45. The fitting according to claim 40 wherein said first aperture is aligned with said first channel.

* * * * *